United States Patent [19]

Sturges, Jr.

[11] Patent Number: 4,485,067
[45] Date of Patent: Nov. 27, 1984

[54] FUEL TRANSFER MANIPULATOR FOR LIQUID METAL NUCLEAR REACTORS

[75] Inventor: Robert H. Sturges, Jr., Plum Boro, Pa.

[73] Assignee: Westinghouse Electric Corp., Pittsburgh, Pa.

[21] Appl. No.: 344,250

[22] Filed: Jan. 29, 1982

[51] Int. Cl.³ ............................................. G21C 19/22
[52] U.S. Cl. .................................................. 376/270
[58] Field of Search ......................................... 376/270

[56] References Cited
U.S. PATENT DOCUMENTS 3,089,836  5/1963  Wootton ............................. 376/270
3,915,792 10/1975  Aubert et al. ...................... 376/270
3,955,692  5/1976  Cody et al. ......................... 376/270
3,962,032  6/1976  Berniolles et al. ................. 376/270
4,096,031  6/1978  Wade ................................. 376/270

Primary Examiner—Sal Cangialosi

[57] ABSTRACT

A manipulator for transferring fuel assemblies between inclined fuel chutes for a liquid metal nuclear reactor. Hoisting means are mounted on a mount supported by beams rotatably attached by pins to the mount and to the floor. Rotation of the beams can be impelled by a one dimensional movement causing the manipulator to accomplish a complicated, two dimensional transfer.

2 Claims, 4 Drawing Figures

FUEL TRANSFER MANIPULATOR FOR LIQUID METAL NUCLEAR REACTORS

BACKGROUND OF THE INVENTION

This invention relates to a fuel transfer manipulator for liquid metal cooled fast breeder nuclear reactors (LMFBR). The function of the manipulator is to transfer fuel assemblies from a fuel chute arising from the reactor vessel to and from a fuel chute arising from a fuel storage pit to facilitate passage of fuel assemblies therebetween during reactor refueling operations.

The fuel assemblies of LMFBRs are immersed in a liquid metal coolant, usually liquid sodium, which can burn if exposed to environmental oxygen. Consequently, the systems for removing and replacing the fuel assemblies from the reactor must do so while maintaining the assembly in a sealed and protected environment. The usual method is to hoist the assemblies to and from the nuclear reactor vessel and to and from the fuel storage pit via two fuel chutes. The chutes terminate at one end in a transfer chamber where the fuel assembly must be transferred from one chute to the other. The transfer chamber is normally filled with an inert gas such as Argon. Because the transfer chamber is open to the reactor and to the fuel storage pit during fuel transfers, the transfer chamber is considered to be a high radiation and high temperature area to which human access is restricted.

The transfer chamber must be a small size because of the gaseous inerting requirement and because of space limitations imposed by the proximity of other equipment.

The transfer manipulator might be a hoist mounted on a bridge trolley, but this solution does not easily match the required motion because the lifting of the hoist must be remotely coordinated with trolley movement. The manipulator might be a pendulum mounted hoist but this solution suggests a tall structure.

Consequently, it is desired to provide a transfer manipulator which is simple in operation and construction, suitable for long term use in high temperature, high radiation areas, and small in size.

SUMMARY OF THE INVENTION

The invention is a fuel transfer manipulator termed a shifting-beam carriage. Four legs support a hoist box to which each leg is rotatably fixed at one end by pin attachments. Each leg is rotatably fixed at the other end to a base by pin attachments. The hoist is shiftable between two extreme positions which correspond to respective alignment configurations between the hoist and a reactor vessel fuel chute and between the hoist and a fuel pit fuel chute.

DETAILED DESCRIPTION

Figure 1:
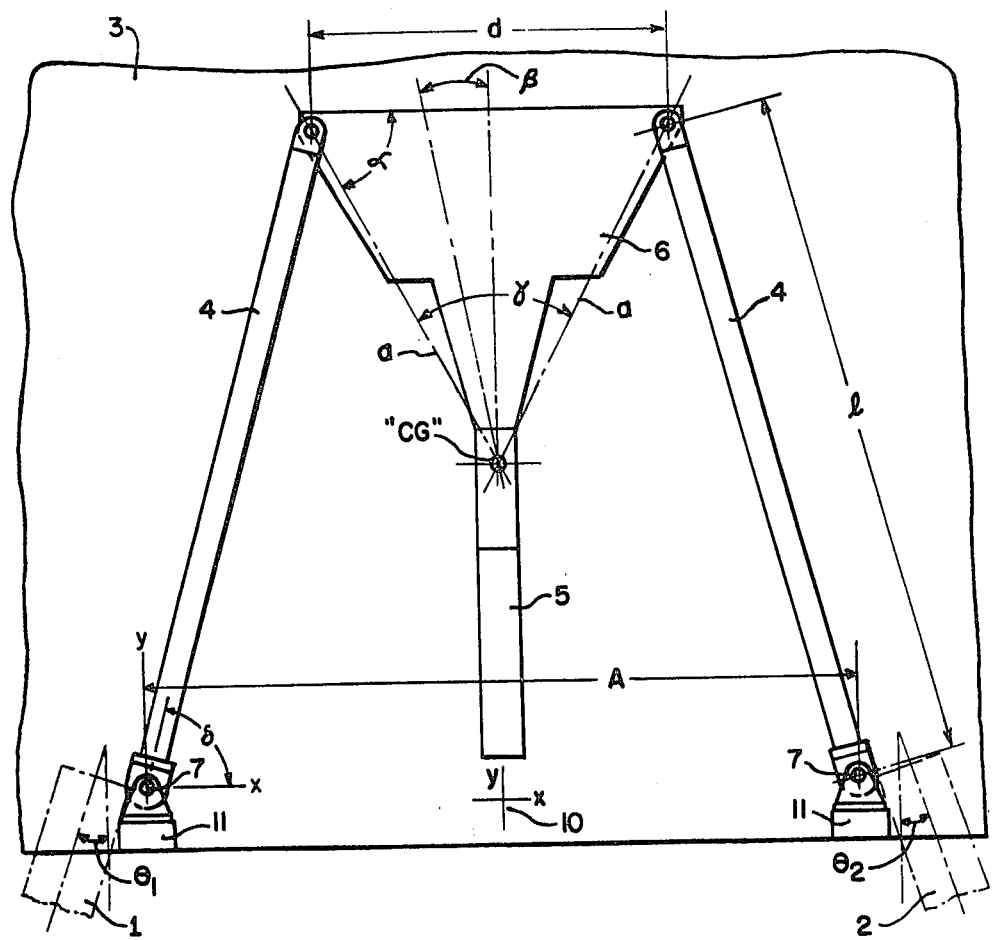
FIG. 1 is a schematic of the shifting beam carriage.

The problem to be solved by this invention will be restated with reference to FIG. 1. Fuel pit fuel chute 1 rises from a fuel pit (not shown) at an angle $\theta_1$ from vertical. Reactor vessel fuel chute 2 rises from a reactor vessel (not shown) at an angle $\theta_2$ from vertical. In a current design of an LMFBR, $\theta_1$ and $\theta_2$ are equal and are approximately 20 degrees.

It will be shown later that the sophistication and great advantage of this invention are especially striking when $\theta_1$ and $\theta_2$ have different values.

Fuel assemblies, (not shown) of approximately 1200 lbs. weight, are to be transferred between chutes 1 and 2. Part of the problem is that the chutes are not vertical. A hoist and trolley arrangement can accomplish the transfer with difficulty by coordinating movement of the trolley along the x axis (see coordinate axes 10) with hoist movement along axis y to achieve movement parallel to $\theta_1$ and $\theta_2$ and the transfer between chutes 1 and 2. The coordination would require visual human control or complex computer control, both being undesirable.

The current invention is a shifting beam carriage having a plurality of beams 4 supporting a hoist box 6. The beams 4 are attached to hoist box 6 and to a base plate or series of base plates 11 by rotatably free pins 7. Hoist box 6 contains hoisting means (not shown) and may support a hoist tube 5.

Shifting of the carriage generally back and forth along the x axis as permitted by pin 7 attachments is planned by certain design parameters to bring hoist tube 5 into alignment with respectively $\theta_1$ and $\theta_2$ and also to bring the end of hoist tube 5 into close proximity respectively to chutes 1 and 2.

FIG. 1 defines symbols for angles and lengths used to design the shifting beam carriage. "CG" is the center of gravity of the carriage with a loaded fuel assembly.

Given that hoist tube 5 is inclined from the vertical by an angle $\beta$ when the CG is midway between chutes 1 and 2, define:

$$\theta_0 = \frac{\theta_1 + \theta_2}{2}$$

and note:

$$\beta = \frac{\theta_1 - \theta_2}{2}$$

One can choose d and l such that:

$$\delta \approx \theta_0$$

and note that:

$$\alpha = \cos^{-1} \frac{d}{2a}$$

and $$\gamma = 2 \sin^{-1} \frac{d}{2a}$$

One can now iteratively solve for $\alpha$ and "a" such that:

$$\left.\frac{\partial y}{\partial x} \approx 0\right|_{0 < x < 1}$$

Using the equation for x and y, the position of the CG, viz:

$$\{\sin\alpha[(x-1)\sin\gamma - y\cos\gamma](x^2 + y^2 + a^2 - l^2) + \quad (A)$$
$$y\sin\alpha[(x-1)^2 + y^2 + a^2 - l^2]\}^2 +$$
$$\{\sin\alpha[(x-1)\cos\gamma + y\sin\gamma](x^2 + y^2 + a^2 - l^2) -$$
$$x\sin\alpha[(x-1)^2 + y^2 + a^2 - l^2]\}^2 =$$
$$4a^2\sin^2\alpha\sin^2\gamma[x(x-1) - y^2 - y\cot\gamma]^2$$

The above calculational process provides parametric values used to design the walking beam carriage.

Figure 2:
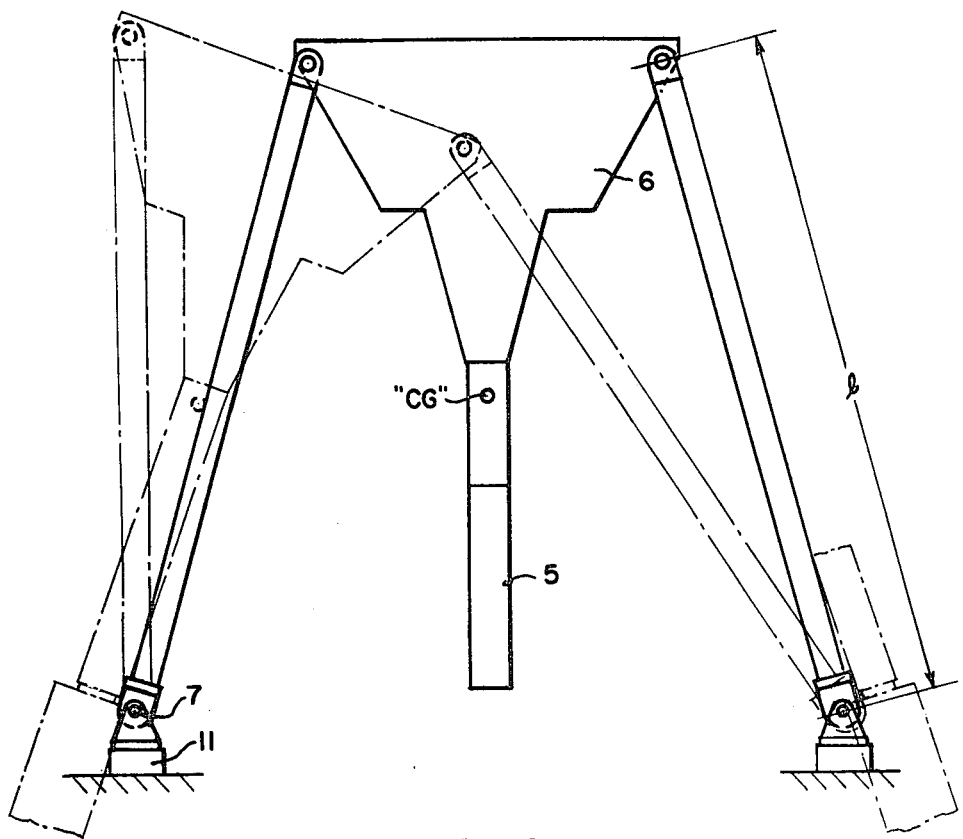
FIG. 2 is a schematic of the shifting beam carriage showing three positions.

Refer to FIG. 2 which shows the shifting beam carriage in three positions. Position 13 shows hoist tube 5 in juxtaposition to fuel pit fuel chute 1, position 15 shows hoist tube 5 in juxtaposition to reactor vessel fuel chute 2, and position 14 is midway between the two.

In positions 13 and 15, hoist tube 5 can receive or dispense a fuel assembly into or out of the chute. In both positions hoist tube 5 is aligned with the chute at angle $\theta_1$ or $\theta_2$ so that the transfer of the fuel assembly therebetween is smoothly accomplished by a simple hoisting act.

Note that the center of mass 12 of the carriage (with a fuel assembly within hoist tube 5) moves along an approximately horizontal straight line (see FIG. 2). The movement of the carriage between positions 13 and 15 therefore does not occasion addition or loss of potential energy and can be impelled by forces merely sufficient to overcome frictional resistance, principally in pins 7. A pendulum mounted hoist would not share this advantage. While the carriage must be sufficiently strong to support the fuel assembly, certain components which transmit only transfer forces may be of decreased bulk and/or increased reliability due to exposure to smaller stress.

DESCRIPTION OF THE PREFERRED EMBODIMENT

Figure 3:
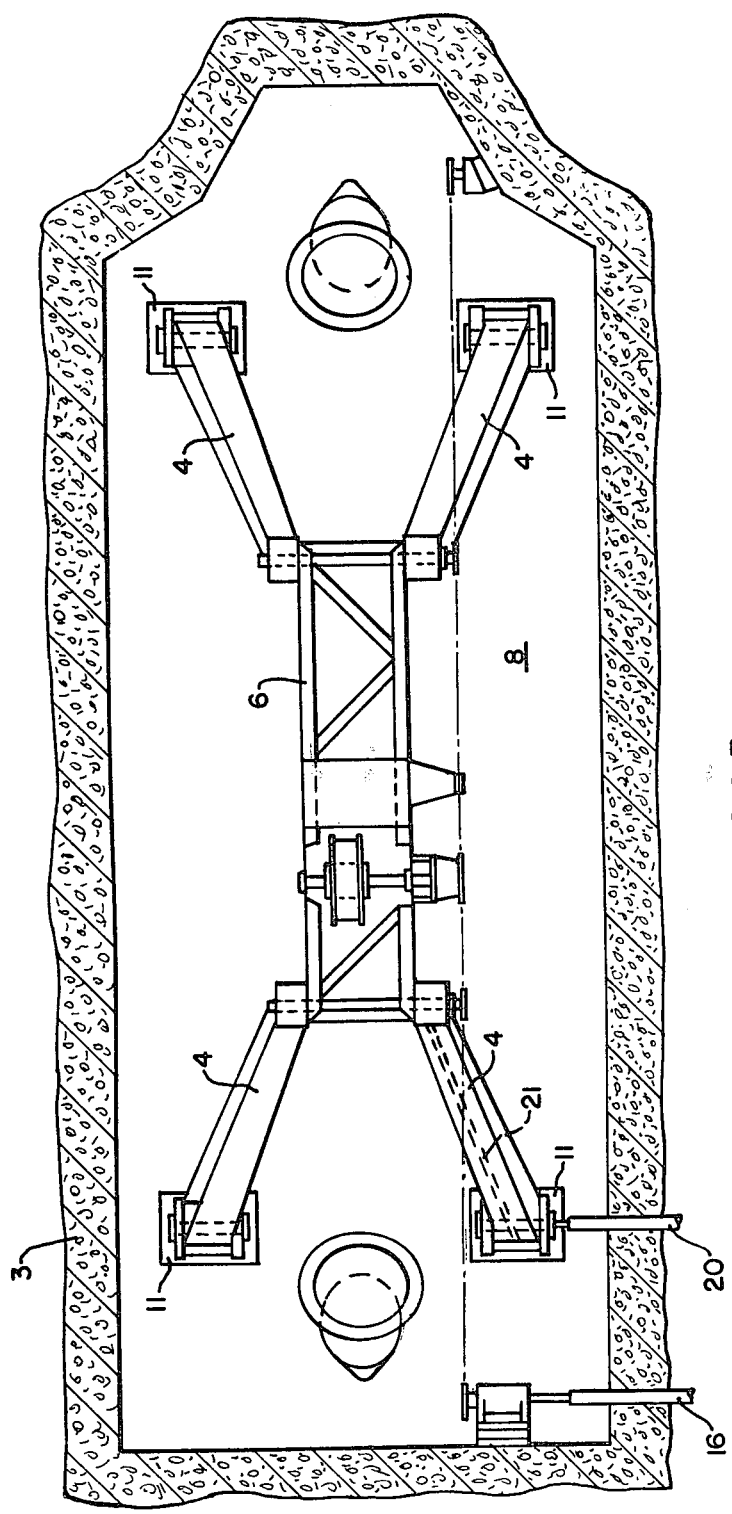
FIG. 3 is a plan view of the shifting beam carriage.
Figure 4:
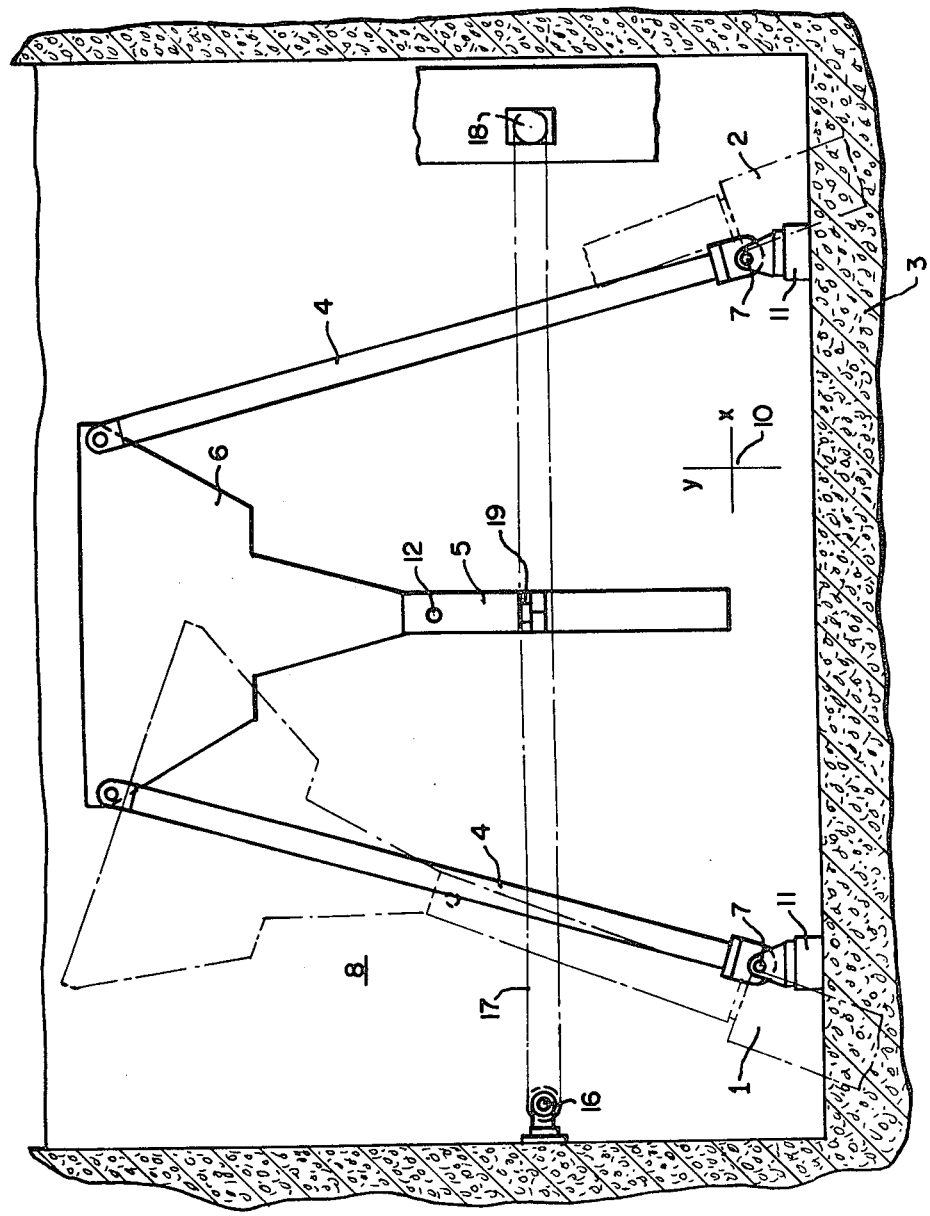
FIG. 4 is a profile view of the shifting beam carriage.

FIGS. 3, 4 illustrate a preferred embodiment in which four beams 4 support a hoist box 6 via six pins P1, P2, P3, P4, P5, P6. In the plan view of FIG. 3, and in the profile view of FIG. 4, means for control of the carriage are shown. A transfer drive shaft 16 penetrates wall 3 and drives transfer chain 17. Transfer chain 17 traverses the chamber and forms an endless circle around pulley 18. At point 19, chain 17 is fixed to hoist tube 5. When chain 17 is rotated clockwise by shaft 16, hoist tube 5 is moved in the direction of fuel pit fuel chute 1. The entire carriage pivots at P1, P2, P3, P4, P5 and P6 and hoist tube 5 moves into the configuration labeled 15 in FIG. 2. When chain 17 is rotated counterclockwise, the carriage pivots into the configuration labeled 13 in FIG. 2. Because point 19 is below the center of mass 12, a mechanical advantage exists which reduces the required transfer force.

Chain 17, shaft 16, and associated components need exert forces and withstand stresses merely adequate to overcome frictional forces during transfer and need not be sufficiently strong to bear the fuel assembly weight.

FIG. 3 also shows a winch drive shaft 20 with a winch chain 21 for control of a hoist located in hoist box 6.

The rotary shafts 16 and 20 can be easily sealed at the sites of penetration through wall 3 to prevent escape of inerting gas or radiation. Outside the transfer chamber, these shafts will connect to drive motors which are then available for maintenance. The shafts can be externally calibrated and labeled to allow remote, and perhaps blind, operation.

The motion of the transfer chain 17 for the transfer from one chute to the other is a simple linear motion of one degree of freedom. The complicated motion of the hoist tube 5, is an inherent feature of the carriage, even if the chutes are inclined at different angles $\theta_1$ and $\theta_2$. The carriage will transfer between chutes by means of a simple rotation of drive shaft 16 and the operation need not coordinate motions in two directions.

The carriage is a squat, small and simple structure which can be easily constructed to be sufficiently reliable to provide many years of maintenance free operation in a hostile environment.

I claim:

1. A fuel assembly transfer device for a liquid-metal fast-breeder nuclear reactor, said transfer device operable to transfer individual fuel assemblies to and from a first fuel chute arising from the vessel of said reactor and a second fuel chute arising from a fuel assembly storage pit, said fuel chutes being spaced a predetermined distance from one another and inclined toward each other at predetermined angles with respect to the vertical, said fuel assembly transfer device positioned above said fuel chutes and comprising:

a transfer chamber having a base portion and enclosing moving portions of said transfer device and extremities of said fuel chutes, means for maintaining an inert gas atmosphere within said transfer chamber, and said chutes projecting through the base portion of said transfer chamber and opening into said transfer chamber in axially spaced relationship;

a first pair of base plate members affixed to the base portion of said transfer chamber and laterally spaced on either side of said first fuel chute, a second pair of base plate members affixed to the base portion of said transfer chamber and laterally spaced on either side of said second fuel chute;

four upstanding supporting beam members of predetermined length, each of said beam members pivotally affixed at the lower end thereof to each of said base plate members, a hoist box member having controllable fuel-assembly hoisting means, said hoist box member having four upper corner portions to which said upstanding supporting beam members are pivotally affixed proximate their upper ends, and a hoist tube member rigidly affixed to said hoist box member and extending downwardly therefrom; and said upstanding supporting beam members together with said hoist box member and said affixed hoist tube member being pivotally movable to align said hoist tube member either with said first tube chute or said second tube chute; and actuating means for controllably moving said hoist box member and said hoist tube member and pivoting said supporting beams to cause said hoist tube member to move laterally to and from an aligned orientation with said first tube chute and said second tube chute in order to permit transfer of fuel assemblies, said actuating means is controlled from a location exteriorly of said transfer chamber, and said fuel-assembly hoisting means is controlled from a location exteriorly of said transfer chamber.

2. The fuel assembly transfer device as specified in claim 5, wherein said actuating means comprises an endless driving chain affixed to said hoist tube member, said driving chain is driven by a motor-driven shaft, and controls for said motor-driven shaft are positioned exteriorly of said transfer chamber.

* * * * *